United States Patent [19]

Rowland-Hill et al.

[11] Patent Number: 4,466,231
[45] Date of Patent: Aug. 21, 1984

[54] AUTOMATIC SIEVE AND CHAFFER ADJUSTMENT IN A COMBINE HARVESTER

[75] Inventors: E. William Rowland-Hill; Ronald T. Sheehan, both of Lancaster, Pa.

[73] Assignee: Sperry Corporation, New York, N.Y.

[21] Appl. No.: 413,193

[22] Filed: Aug. 30, 1982

[51] Int. Cl.³ .................... A01D 45/00; A01D 75/00
[52] U.S. Cl. ................................. 56/10.2; 56/14.6; 56/DIG. 15; 130/27 R
[58] Field of Search ................. 56/10.2, DIG. 15, 208, 56/212, 213, 214, 215, 216, 217, 14.6; 130/27 R

[56] References Cited

U.S. PATENT DOCUMENTS 4,259,829  4/1981  Strubbe .............................. 56/10.2
4,360,998 11/1982  Somes ................................. 56/10.2

FOREIGN PATENT DOCUMENTS 869661 10/1981  U.S.S.R. ............................ 56/14.6

Primary Examiner—Gene Mancene
Assistant Examiner—David I. Tarnoff
Attorney, Agent, or Firm—Griffin, Branigan & Butler

[57] ABSTRACT

In a combine harvester, a microprocessor controls the adjustment of the cleaning sieve or sieves and/or chaffer sieve or sieves in response to information keyed into a keyboard by the combine operator. If the actual setting of a device (sieve or chaffer) is greater than the desired setting the device is first fully opened and maintained in that position for a predetermined period of time to allow foreign objects and crop material to clear itself from the device by normal combine operation. This avoids damage to the control linkage, sieve slats, and so forth. After the device is fully opened and maintained open for the predetermined interval of time it then closes beyond the desired setting by some predetermined amount after which the device is opened to the desired setting. This arrangement insures that the approach to the final adjustment is always made as the device is being opened, thereby allowing for compensation of play or backlash in the mechanical linkages which adjust the device.

11 Claims, 4 Drawing Figures

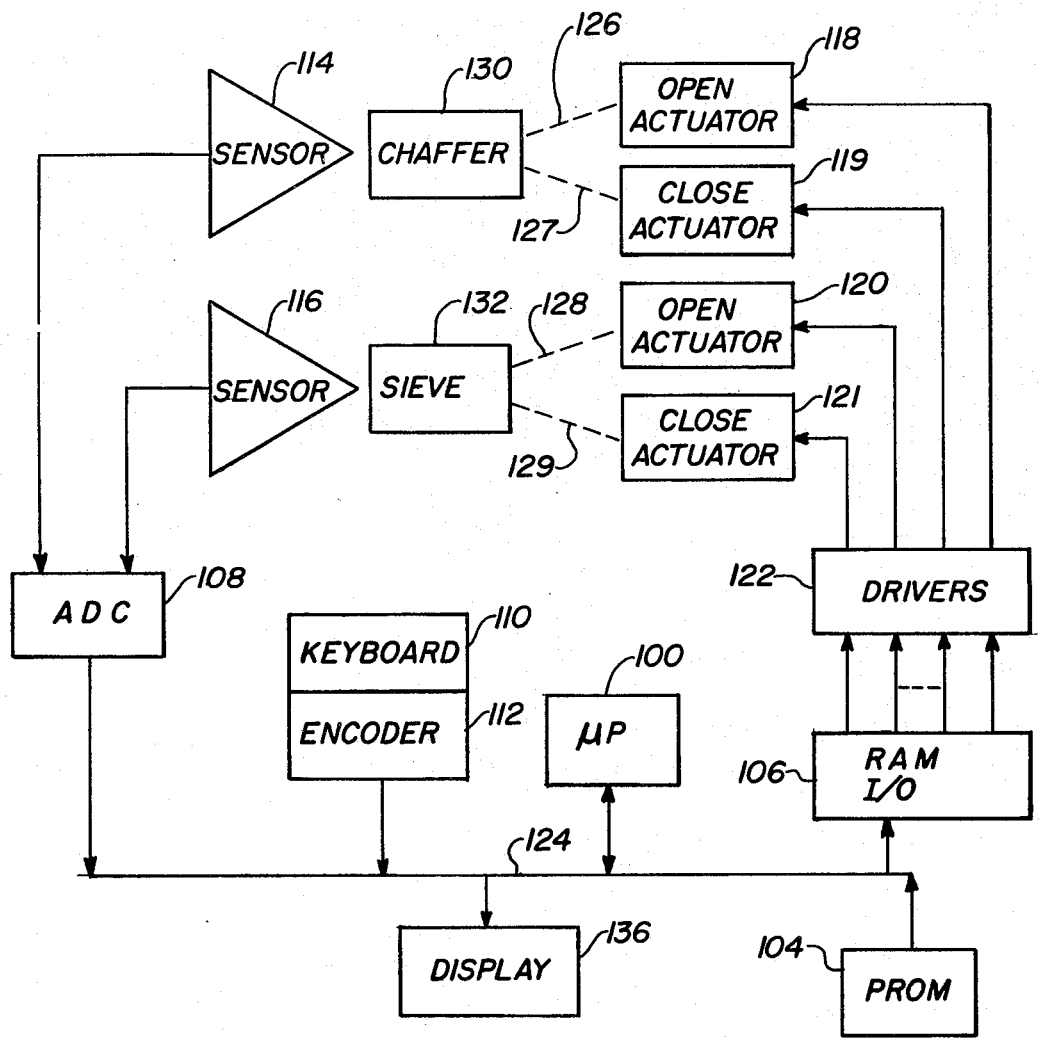
Fig. 1
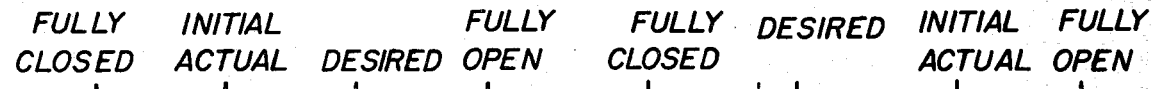
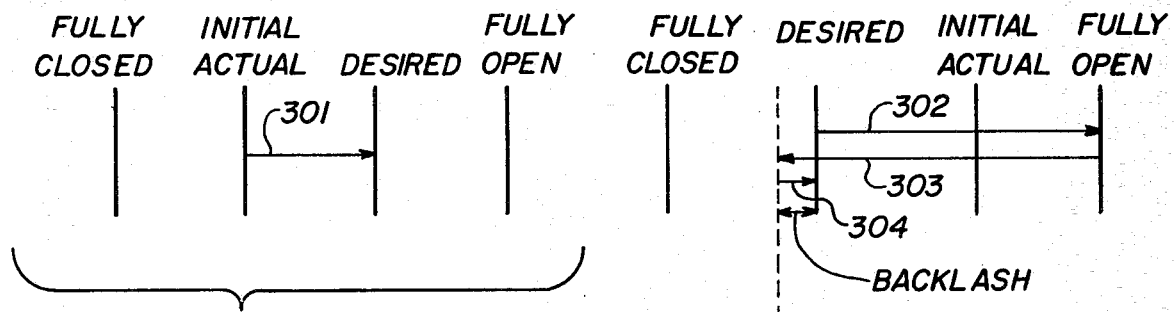
Fig. 3A
Fig. 3B

AUTOMATIC SIEVE AND CHAFFER ADJUSTMENT IN A COMBINE HARVESTER

RELATED APPLICATIONS

This invention is disclosed in application Ser. No. 413,196 filed concurrently herewith entitled AUTOMATIC COMBINE HARVESTER ADJUSTMENT SYSTEM. The disclosure of that application is incorporated herein by reference.

BACKGROUND OF THE INVENTION

Recent improvements in combine harvesters have included microprocessor controls for automatically adjusting various combine operating parameters such as rotor speed, fan speed, concave clearance, chaffer sieve opening and cleaning sieve opening. It has been found that when certain parameters such as the cleaning sieve opening and chaffer sieve opening are placed under microprocessor control, damage to the sieve or chaffer slats may result if the microprocessor attempts to close the cleaning sieve or chaffer sieve opening while there is crop material or some foreign object such as a stone therein.

Another problem encountered with the use of a microprocessor to adjust the cleaning sieve (hereinafter referred to as the sieve) or chaffer sieve (hereinafter referred to as the chaffer) occurs because of play or backlash in the mechanical linkages or between the actuators and the sieve or chaffer. This problem destroys the accuracy of a control system where it is desired to make the adjustment of the chaffer and sieve openings to an accuracy of less than 0.030 inch.

BRIEF SUMMARY OF THE INVENTION

An object of the present invention is to provide a method and apparatus for adjusting the sieve and/or chaffer on a combine harvester, said method and apparatus reducing the probability of the sieve or chaffer being damaged by crop material or foreign objects as it is adjusted.

An object of the present invention is to provide a method and apparatus for adjusting the sieve or chaffer of a combine harvester, said method and apparatus permitting adjustment to a greater degree of accuracy than heretofore obtainable.

The foregoing and other objects of the invention are accomplished by providing a combine with a microprocessor, a keyboard, sensors for sensing the position of the sieve and/or chaffer and actuators for driving the sieve and/or chaffer. The microprocessor derives a desired setting of the sieve or chaffer in response to information entered through a keyboard. The sensors monitor the actual positions of the sieve and chaffer and the outputs from the sensors are converted to digital values by an analog to digital converter before being applied to the microprocessor. The microprocessor compares the desired setting of a device (sieve or chaffer) wth the actual setting thereof and sends signals to the actuators for moving the device to the desired setting. When the desired setting is less than the actual setting, the microprocessor energizes an actuator to fully open the device. After a delay to allow crop material and foreign matter to work its way out of the device as a reslut of normal shaking of the device, the device is driven in the closing direction past the desired setting by some predetermined amount. The microprocessor then energizes an actuator to open the device to the desired setting.

Other objects of the invention and its mode of operation will become apparent upon consideration of the following description and the accompanying drawings.

BRIEF DESCRIPTION OF THE DRAWINGS

FIG. 1 is a block diagram of a microprocessor controlled system for adjusting the sieve and chaffer on a combine harvester;

DETAILED DESCRIPTION OF THE INVENTION

Figure 2:
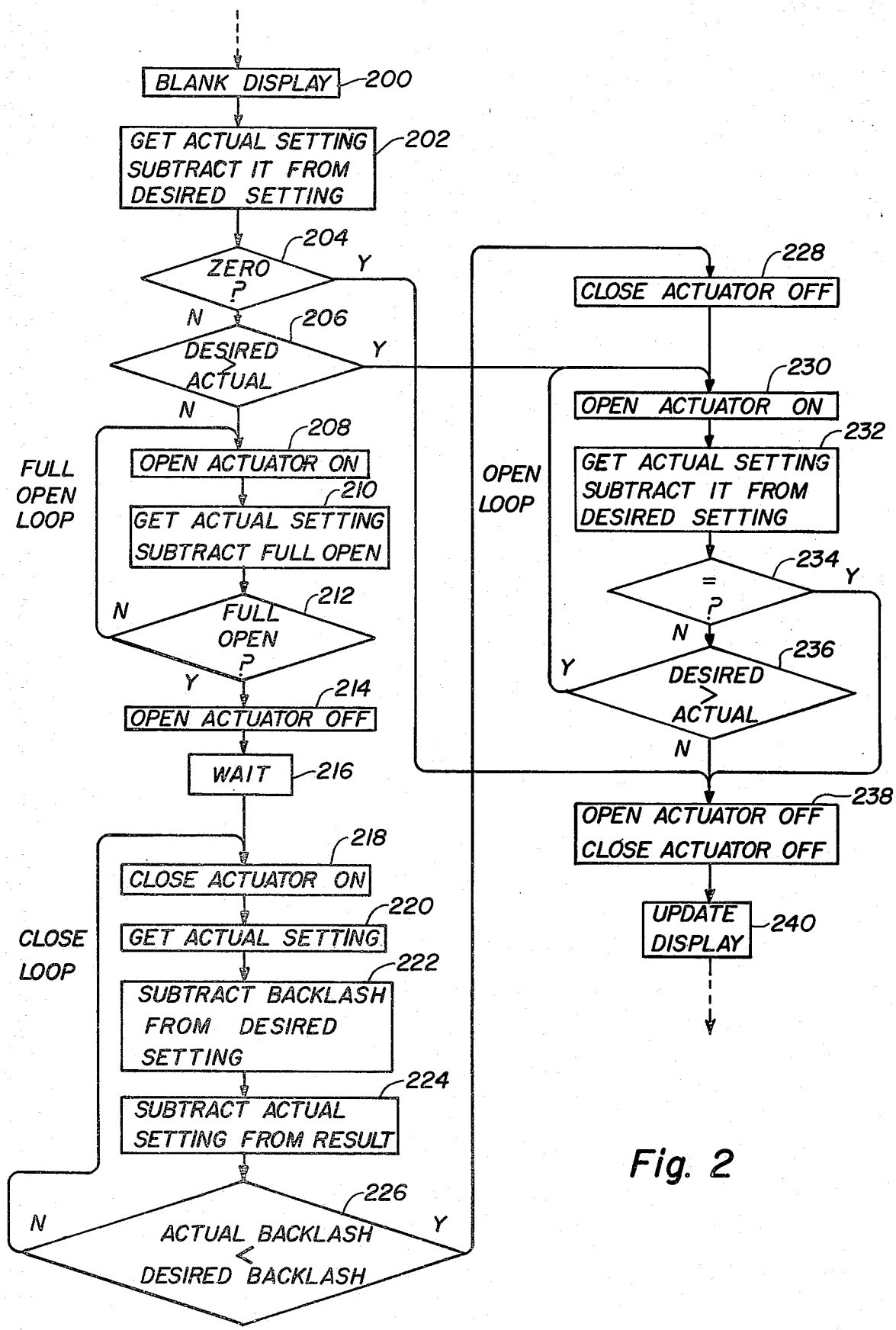
FIG. 2 is a flow diagram illustrating the steps performed in adjusting the sieve or chaffer; and, FIG. 3A and 3B are diagrams illustrating the movement of a sieve or chaffer as it is adjusted from any position to a more open position, and to a more closed position, respectively.

FIG. 1 illustrates an automatic combine harvester control system such as that disclosed in the aforementioned copending application. The system of FIG. 1 includes a microprocessor 100, a programmable read only memory 104, a random access memory and input-/output unit (RAM I/0) 106, an analog to digital converter 108, a keyboard 110 having an encoder 112, a sensor 114 for sensing the chaffer position, a second sensor 116 for sensing the position of the sieve, and a plurality of actuators 118–121. The sensors 114 and 116 continuously sense the positions of the chaffer 130 and sieve 132, respectively, and apply analog output signals representing these positions to a multiplexing analog-to-digital converter (ADC) 108. The ADC 108 may be addressed by the microprocessor 100 to place on a data bus 124 a digital value representing the chaffer position or the sieve position. Addressing signals from the microprocessor 100 control ADC 108 to determine whether the value of the sieve position or the chaffer position is placed on the data bus 124.

The combine operator may key into keyboard 110 information concerning the desired operating parameters for the combine. He may, for example, select the type of crop to be harvested and the moisture level of that crop in which case the microprocessor 100 obtains from stored tables in PROM 104 a set of values for adjusting the operating parameters of the combine. Alternatively, the combine operator may strike a device key on the keyboard 110 to select a desired device (chaffer, sieve, etc.) and then key in a digital value representing the desired setting of that device. In this case the microprocessor 100 derives from the data keyed in at the keyboard a value representing the desired setting of the device. A visual display means 136 is provided for visually indicating values keyed into keyboard 110 and the actual settings of the devices as sensed by the sensors.

Regardless of the manner of obtaining the desired setting of a device, after it is obtained, the microprocessor operates through RAM I/0 106 to selectively apply signals through drivers 122 to the actuators 118–121. The actuator 118 acts through a mechanical linkage or drive mechanism represented by a broken line 126 to move the chaffer in a direction tending to increase the chaffer opening. Actuator 119 acts through mechanical linkage or drive mechanism 127 to move the chaffer 130 in a direction to close its opening. The actuator 120 acts through a linkage or drive mechanism 128 to move the sieve in a direction to increase the sieve opening while the actuator 121 acts through mechanical linkage or drive mechanism 129 to move the sieve 132 in a direction tending to close its opening. While four separate actuators 118–121 are shown to better illustrate the functional operation of the system, a preferred embodiment comprises two reversible motors, one motor serving the function of actuators 118 and 119 and the other motor serving the function of actuators 120 and 121.

Reference may be had to the aforementioned copending application for a more complete description of the system operation. With respect to the present invention, it is sufficient to note that at some point the microprocessor 100 will have stored in the random access memory portion of RAM I/0 106 values indicating the desired settings of the chaffer and/or sieve. Upon the striking of an ADJUST key on keyboard 110 the microprocessor 100 initiates a routine to adjust the setting of the chaffer and/or sieve in accordance with these values. As explained in the copending application, devices other than the chaffer and sieve may be adjusted during the adjusting routine.

FIG. 2 is a flow diagram illustrating the steps performed by microprocessor 100 during the adjustment routine, and more particularly to the steps performed when adjusting the chaffer opening. The chaffer adjustment routine begins by blanking that portion of display 136 which displays the chaffer setting. Next, the microprocessor 100 addresses the analog to digital converter 108 to obtain the actual chaffer setting. This is accomplished by taking the average of eight readings as explained in the copending application. After the actual setting of the chaffer is obtained the microprocessor compares the actual setting with the desired setting which has been retained in RAM I/0 106. This is accomplished by subtracting the desired setting from the actual setting. If the result is zero it is detected at 204. This means that the chaffer is already at the desired position and no adjustment is necessary. The microprocessor branches to a block of instructions 238 where it sends signals to the I/0 portion of RAM I/0 106 to turn off both the open actuator and close actuator for the chaffer. Actually, since these actuators are already off, the instructions in block 238 merely insure that the actuators are not energized. The display 136 is then updated at step 240 to display the actual chaffer setting.

Returning to step 204, if the actual setting is not equal to the desired setting the microprocessor executes instructions indicated generally at 206 to see if the desired setting is greater than the actual setting. If it is, it means that the device must be moved to a more open position. In this case there is no danger of foreign objects or crop material in the device causing damage as the adjustment is made. The microprocessor branches to a loop of instructions 230, 232, 234 and 236 which controls the opening of the device. The microprocessor sends signals to the I/0 portion of RAM I/0 106 and these signals, acting through one of the drivers 122 turns on the open actuator 118 which controls the movement of the chaffer toward the fully opened position. As the chaffer is moved its position is sensed by sensor 114 which sends signals to ADC 108 representing the changing positions.

At 232 the microprocessor 100 repetitively generates signals to address ADC 108 and sample the output of the ADC representing the actual chaffer position. Again, the actual chaffer position is determined by the microprocessor 100 by taking the average of several samples of the output of the ADC 108. After the actual setting of the chaffer is obtained it is compared with the desired setting by subtracting it from the desired setting. The result is first tested at 234 to see if the actual setting is equal to the desired setting. If it is, the adjustment is complete and the program jumps to block 238 where the microprocessor sends signals to RAM I/0 106 to turn off both the open actuator 118 and the close actuator 119. Since the close actuator is not on, the act of turning it off at 238 is a mere precautionary measure.

If at decision point 234 the actual setting is not equal to the desired setting then a test is made at 236 to see if the desired setting is still greater than the actual setting. If it is, the program loops back to step 230 and repeats the loop.

As the loop is repeated the chaffer is successively advanced toward the more open position until the actual setting of the chaffer equals the desired setting. This equality is detected at 234 and the program jumps to block 238 to turn off the actuators which position the chaffer. After the adjustment is completed the program moves to block 240 where the digital display 136 is updated to display the new chaffer opening.

FIG. 3A illustrates the movement of the chaffer when the test at step 206 indicates that the desired setting is greater than the actual position of the chaffer.

Returning to decision point 206, if the test shows that the desired position of the chaffer is not greater than the actual position of the chaffer, it means that the chaffer must be closed. Suppose however that there is crop material or some foreign object or material in the chaffer. In accordance with the present invention the chaffer is first opened to allow any material therein to work its way out of the chaffer before the chaffer is moved towards the desired location. In FIG. 3B this movement is represented by the line 302. At step 208 the microprocessor 100 sends signals to RAM I/0 106 which in turn acts through drivers 122 to apply a signal to the open actuator 118 for the chaffer. The microprocessor 100 then obtains the actual setting of the chaffer from ADC 108 in the manner previously described and compares it with a constant which represents a fully opened chaffer position. The comparison is made by subtracting the fully opened value and testing the result at step 212 for equality. If the chaffer is not fully opened the program loops back to block 208 and continues sending signals to the open actuator 118 to drive the chaffer 130 toward the fully opened position. Eventually, the chaffer will be at the fully opened position and when the test is made at step 212 the program will advance to step 214 where the microprocessor 100 sends signals to RAM I/0 106 which in turn acts through one of drivers 122 to turn off the open actuator 118.

At 216 the microprocessor executes a sequence of delay instructions during which nothing of consequence takes place in the microprocessor. During this delay interval the chaffer is still operating and any material that may be therein is allowed to work itself out of the chaffer as a result of the normal continuous shaking of the chaffer. This shaking is accomplished by a conventional mechanism (not shown).

After the delay interval to permit the material to work its way out of the chaffer, the microprocessor proceeds to the loop of instructions 218, 220, 222, 224 and 226. These instructions comprise a closed loop for closing the chaffer from the fully opened position to a backlash-compensating position which is between the desired position and the fully closed position. In other words, this loop controls the chaffer for movement as indicated by the line 303 in FIG. 3B. The loop begins when the microprocessor sends a signal to RAM I/0 106 which in turn produces a signal through drivers 122 to turn on the close actuator 119 for the chaffer. The chaffer begins its movement toward the backlash position. Meanwhile, the microprocessor 100 addresses ADC 108 and develops a value representing the actual chaffer position at the time of sampling.

At step 222 the microprocessor subtracts some backlash value from the desired setting. At step 224 the actual value, obtained at step 220, is subtracted from the result obtained in step 222. At step 226 the result of step 224 is tested to see if the actual setting is less than the desired setting minus the backlash. If it is not, the program loops back to step 218 and repeats the loop thereby moving the chaffer closer toward the fully closed position. Eventually, the test at step 226 will prove true indicating that the chaffer has been closed beyond the desired setting by an amount great enough to take up any play or backlash in the linkage 126 when the open actuator is subsequently turned on to move the chaffer to the desired position. The program proceeds to step 228 where the microprocessor sends a signal to RAM I/0 106 to terminate the signal to the close actuator 119. The chaffer is now at the backlash position illustrated in FIG. 3B.

The program then moves to step 230 which is the first step of the loop of instructions for opening the chaffer. At step 230 the microprocessor 100 sends a signal to RAM I/0 106 which acts through one of drivers 122 to turn on the open actuator 118. Through mechanical linkage 126 the actuator 118 moves the chaffer 130 in a direction to increase its opening. The chaffer begins moving as indicated by the line 304 in FIG. 3B. Meanwhile, as represented by the block 232, the microprocessor addresses the ADC 108, obtains a value representing the actual setting of the chaffer at the time of sampling, and subtracts it from the desired setting value. As long as the desired setting value is greater than the actual setting, the program proceeds through steps 234 and 236 and repeats the open loop. Eventually, the actual setting will reach the desired setting. This condition is detected at step 234 at which time the microprocessor sends signals to the RAM I/0 106 to turn off both the open and the close actuators. The microprocessor then updates the display 136 by sending thereto signals representing the desired (now actual) setting of the chaffer.

The routine illustrated in FIG. 2 may be used equally well to adjust the sieve to thereby vary the sieve opening. The only differences might be that the constant value utilized to represent the fully opened position of the sieve at step 210 may be different from the constant use to represent the fully opened position of the chaffer, and the desired backlash value utilized at step 222 for the sieve may be different from the backlash value used for the chaffer.

From the foregoing description it is seen that the present invention provides a novel method and apparatus for adjusting the chaffer or sieve on a combine while materially reducing the probability of damage to the chaffer or sieve by foreign objects or crop material which may be present therein at the time of adjustment. Furthermore, from a comparison of Figs. 3A and 3B it is seen that the desired setting of the sieve or chaffer is always approached as the chaffer or sieve is moving in a direction from the fully closed toward the fully opened position. This takes up play in the mechanical linkages for adjusting the chaffer or sieve and allows a more accurate positioning of these devices.

While a specific preferred embodiment of the invention has been described, it will be understood that various substitutions and modifications may be made in the described embodiment without departing from the spirit and scope of the invention as defined by the appended claims.

The embodiments of the invention in which an exclusive property or privilege is claimed are defined as follows:

1. A method of automatically setting a device on a combine harvester, said device being a sieve which is selectively settable at positions between a fully opened position and a fully closed position, said method comprising:
    generating values representing the actual position and the desired position of said sieve;
    comparing the values representing said actual position and said desired position and driving said sieve to said fully opened position if said comparison indicates that the desired setting is less than said actual position; and,
    subsequently driving said sieve to said desired position.

2. A method as claimed in claim 1 wherein said sieve is driven to said desired position from said fully open position by first driving said sieve from said fully open position to a backlash position intermediate said desired position and said fully closed position, and then driving said sieve from said backlash position to said desired position.

3. A method as claimed in claim 1 or claim 2 wherein said sieve is driven directly from said actual setting to said desired setting if said comparison of values indicates that said actual setting is less than said desired setting.

4. A method as claimed in claim 1 wherein the subsequent driving of said sieve to said desired position is delayed, said sieve being shaken during the interval of said delay to remove material therefrom.

5. A method as claimed in claim 4 wherein said sieve is a chaffer sieve.

6. A method as claimed in claim 4 wherein said sieve is a cleaning sieve.

7. Apparatus for automatically setting a device on a combine harvester, said device being a sieve which is selectively settable at positions between a fully opened position and a fully closed position, said apparatus comprising:
    sensor means for sensing the actual position of said sieve;
    means generating a value representing a desired position of said sieve;
    actuator means for driving said sieve;
    means for comparing the actual position of said sieve with said desired position;
    means responsive to said comparing means for applying first signals to said actuator means to drive said sieve to said fully opened position when said comparing means indicates that said desired position is less than said actual position;
    means for detecting when said sieve has reached said fully opened position; and,
    means responsive to said detecting means for terminating the first signals to said actuator means and applying to said actuator means second signals for driving said sieve to said desired position.

8. Apparatus as claimed in claim 7 wherein the means responsive to said detecting means includes means for terminating said first signals and then waiting for an interval of time before applying said second signals to said actuator means.

9. Apparatus as claimed in claim 8 wherein said sieve is a combine harvester cleaning sieve, and means for shaking said cleaning sieve.

10. Apparatus as claimed in claim 8 wherein said sieve is a combine harvester chaffer sieve, and means for shaking said chaffer sieve.

11. Apparatus as claimed in claim 7 wherein said means responsive to said detecting means comprises:

means for applying said second signals to said actuator means until said sieve is driven an intermediate position between said fully closed position and said desired position;

means for detecting when said sieve has reached said intermediate position; and, means for terminating said second signals and applying said first signals to said actuator means until said sieve reaches said desired position.

* * * * *